United States Patent
Inoko

(10) Patent No.: US 7,817,345 B2
(45) Date of Patent: Oct. 19, 2010

(54) ZOOM LENS AND IMAGE PROJECTION APPARATUS INCLUDING THE SAME

(75) Inventor: Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 12/365,482

(22) Filed: Feb. 4, 2009

(65) Prior Publication Data

US 2009/0195884 A1 Aug. 6, 2009

(30) Foreign Application Priority Data

Feb. 4, 2008 (JP) ............................. 2008-023848

(51) Int. Cl.
*G02B 15/14* (2006.01)
(52) U.S. Cl. ..................... 359/682; 359/676; 359/684
(58) Field of Classification Search ................ 359/676, 359/680–682, 684
See application file for complete search history.

(56) References Cited

U.S. PATENT DOCUMENTS 6,545,817 B2 4/2003 Hirose
6,888,683 B2 * 5/2005 Itoh ........................... 359/686
7,173,766 B2 2/2007 Kimura
2005/0200967 A1 * 9/2005 Yamasaki et al. ........... 359/676
2006/0056043 A1 3/2006 Nakazawa et al.
2007/0229967 A1 10/2007 Nagahara

FOREIGN PATENT DOCUMENTS

| JP | 11-231219 | 8/1999 |
|---|---|---|
| JP | 2002-107626 | 4/2002 |
| JP | 2004-133338 | 4/2004 |
| JP | 2005-010668 | 1/2005 |

* cited by examiner

*Primary Examiner*—Joseph Martinez
*Assistant Examiner*—James R Greece
(74) *Attorney, Agent, or Firm*—Canon USA Inc IP Div

(57) ABSTRACT

A zoom lens includes, in order from an enlargement conjugate side to a reduction conjugate side, a first lens unit of negative refractive power; a second lens unit of positive refractive power; a third lens unit of positive refractive power, the third lens unit having at least three lens elements; a middle lens unit including at least one lens unit; and a last lens unit of positive refractive power. All the lens units, except the first lens unit and the last lens unit, move during zooming. The zoom lens satisfies appropriate conditions.

10 Claims, 10 Drawing Sheets

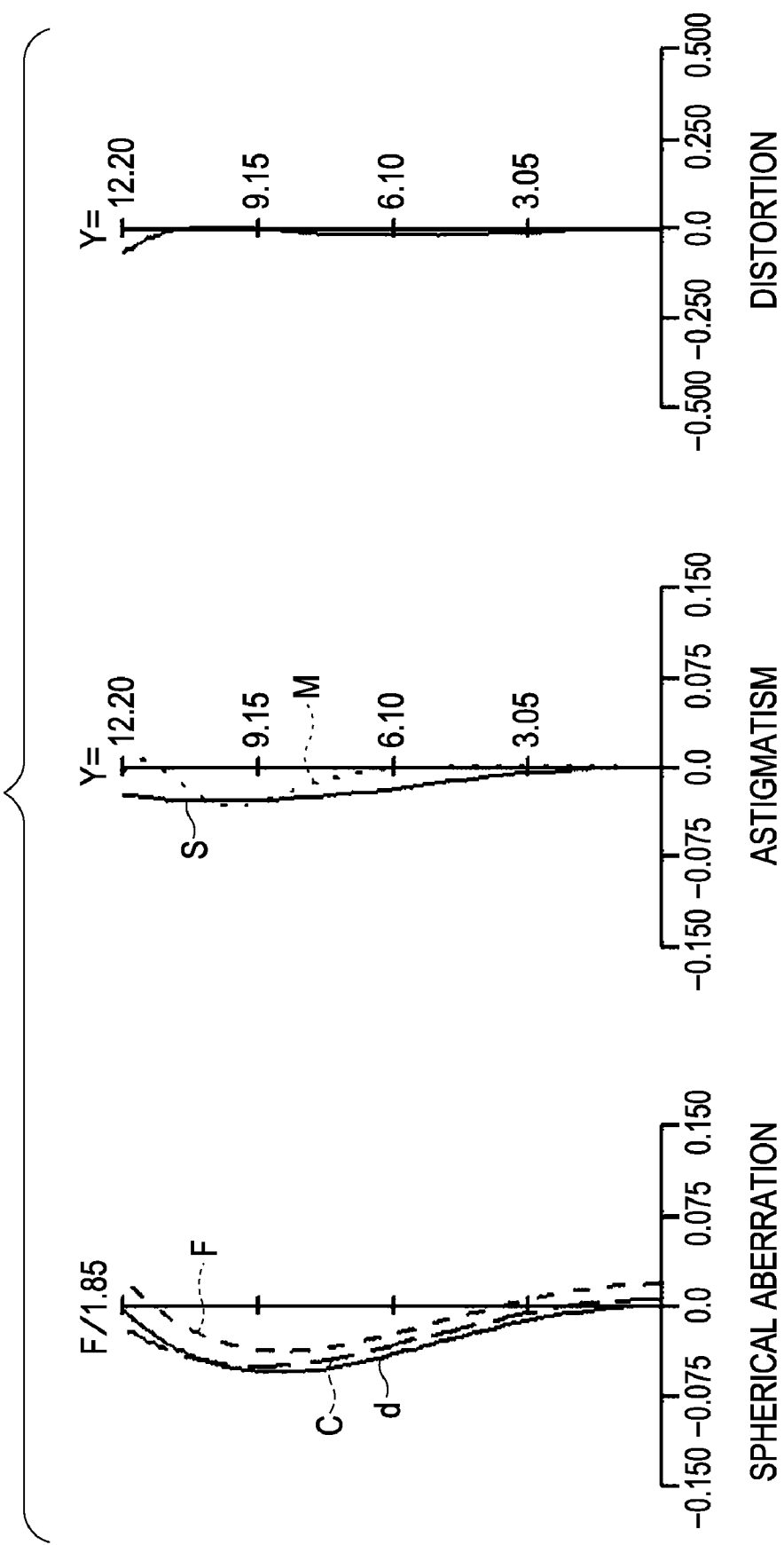

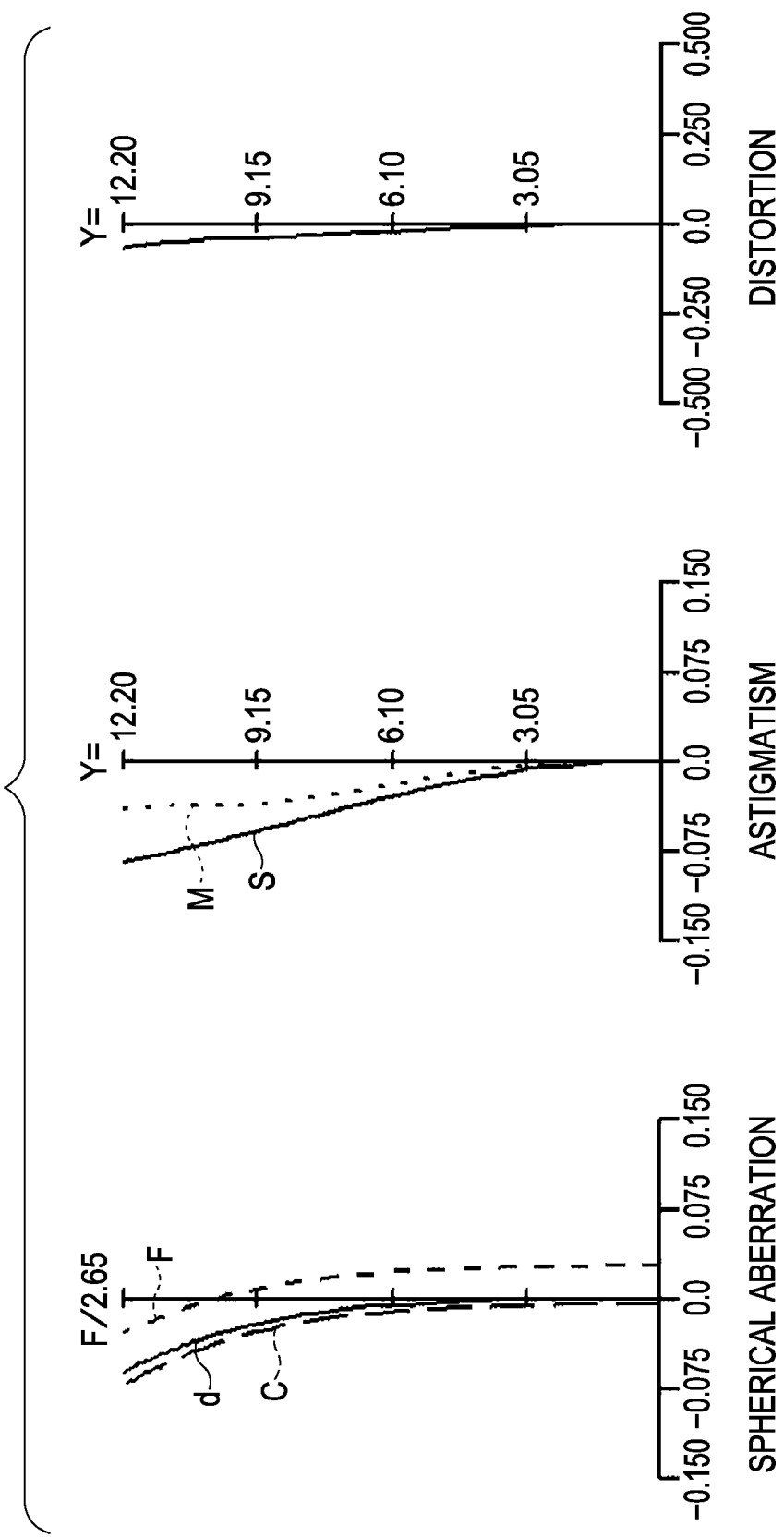

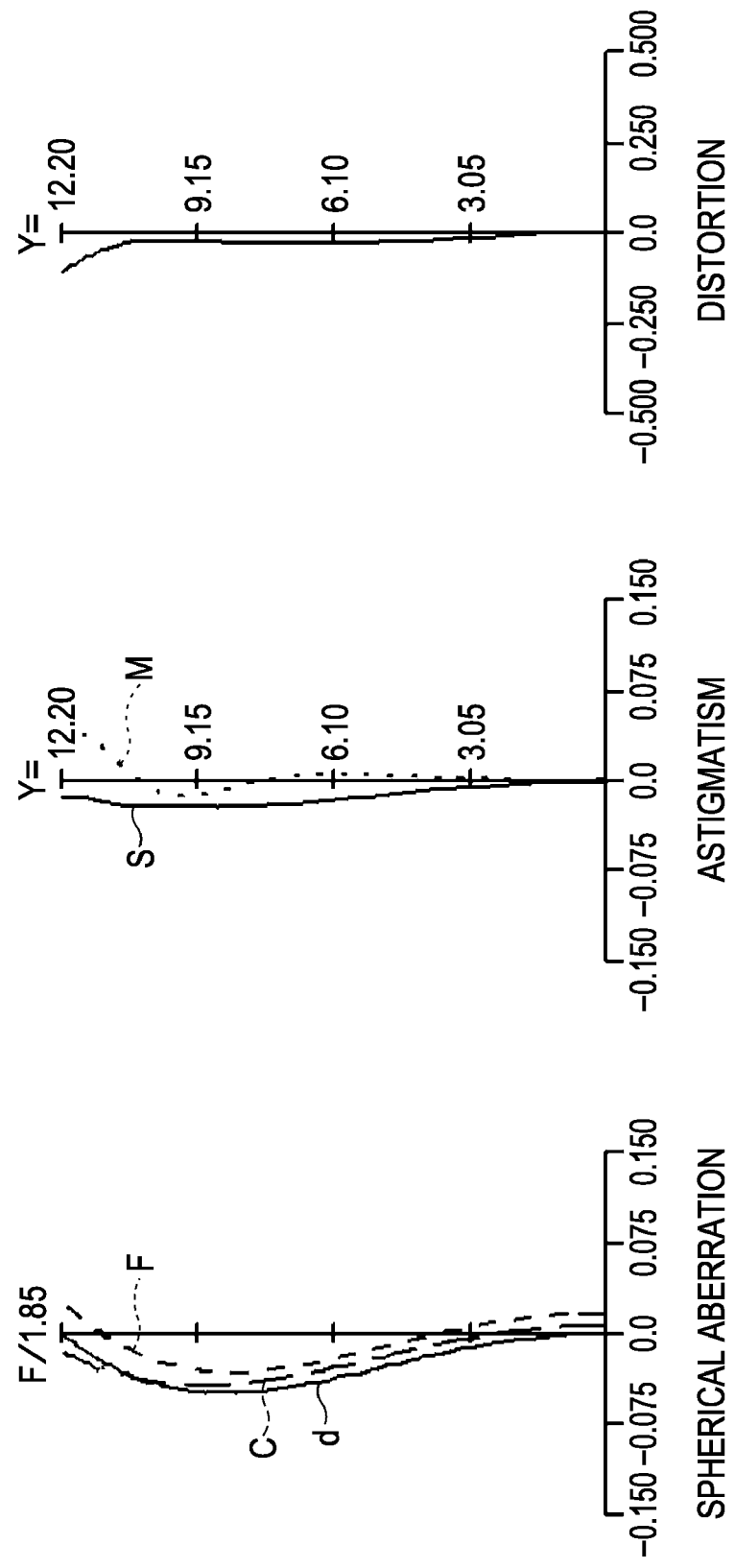

ZOOM LENS AND IMAGE PROJECTION APPARATUS INCLUDING THE SAME

BACKGROUND OF THE INVENTION

1. Field of the Invention

The present invention relates to a zoom lens and an image projection apparatus including the zoom lens. For example, the present invention relates to a zoom lens having a long back focus, providing a high level of optical performance, and suitable for a projector producing a projected image.

2. Description of the Related Art

There have been proposed a variety of projectors (image projection apparatuses) using a display device, such as a liquid crystal display device, to project an image formed on the display device onto a screen surface.

A projection lens included in such a projector is desired to have such characteristics as follows.

In a typical color projector including three display devices, light from a white light source is separated by a color separation optical system into light beams of red, green, and blue colors, which are guided to the corresponding display devices. The light beams ejected from the display devices are synthesized by a color synthesis optical system and are incident on a projection lens. In this configuration, to provide a prism or the like for synthesizing the color light beams passed through the display devices, it is necessary to leave a space between the display devices and the projection lens. Therefore, it is desirable that the projection lens have a certain length of back focus.

If the angles of light beams incident on the color synthesis optical system from the display devices vary, the spectral transmittance of the color synthesis optical system varies accordingly. As a result, the brightness of each color in a projected image varies depending on the field angle and thus, the projected image is difficult to see. To reduce such an effect depending on the field angle, it is desirable that a pupil on the display device side (reduction conjugate side) be substantially at infinity, that is, so-called telecentricity be good.

When pictures (images) on the display devices for three different colors are synthesized and projected onto a screen, the perceived resolution of displayed characters or the like is reduced if, for example, they look double. To prevent this, it is necessary that pixels of the respective colors be superimposed on one another throughout the screen. It is thus desirable that color misregistration (lateral chromatic aberration) that occurs in the projection lens be effectively corrected across the visible light spectrum.

To prevent a projected image from being distorted and becoming difficult to see, it is desirable that distortion be effectively corrected.

As an example of a zoom lens for a projector, there is known a zoom lens including a first lens unit disposed closest to the enlargement conjugate side, having negative refractive power, and fixed during zooming; and a last lens unit disposed closest to the reduction conjugate side, having positive refractive power, and fixed during zooming.

As an example of the zoom lens of this type, there is known a zoom lens in which at least three zoom lens units movable during zooming are disposed between the first lens unit and the last lens unit (see, e.g., U.S. Pat. No. 6,545,817).

In the zoom lens disclosed in U.S. Pat. No. 6,545,817, the second and third lens units disposed in this order from the enlargement conjugate side perform a primary zoom function. In this zoom lens, image plane variation during zooming is corrected by moving the third lens unit and other lens units that follow. In this type of zoom lens, the third lens unit is a very important lens unit for providing a high level of optical performance throughout the zoom range. Therefore, the third lens unit has at least three lens elements to improve optical performance.

A zoom lens for a projector is desired to have a long back focus and be telecentric on the reduction conjugate side. Therefore, a lens unit of negative refractive power is disposed on the enlargement conjugate side and a lens unit of positive refractive power is disposed on the reduction conjugate side.

With the lens configuration described above, since the entire zoom lens becomes asymmetric, it is difficult to provide a high level of optical performance throughout the zoom range. For example, negative distortion often occurs at the wide-angle end, and it is very difficult to correct it.

In the zoom lens disclosed in U.S. Pat. No. 6,545,817, the third lens unit has a greater share of zoom ratio than those of the other lens units. Accordingly, the third lens unit has refractive power greater than that of the other lens units and causes frequent occurrence of aberration variation during zooming. Moreover, due to the great refractive power of the third lens unit, a large amount of negative distortion at the wide-angle end tends to remain.

In the above-described zoom lens for a projector, it is important to set an appropriate lens configuration so as to ensure a predetermined zoom ratio, effectively correct aberration variation during zooming, and provide a high level of optical performance throughout the zoom range.

For example, it is important to appropriately define the refractive power of each lens unit (the second and third lens units, in particular) and the lens configuration of the third lens unit. If the configuration of the second and third lens units is not appropriate, it is difficult to effectively correct distortion at the wide-angle end and provide a high level of optical performance throughout the zoom range.

SUMMARY OF THE INVENTION

According to an aspect of the present invention, there is provided a zoom lens including, in order from an enlargement conjugate side to a reduction conjugate side, a first lens unit of negative refractive power, a second lens unit of positive refractive power, a third lens unit of positive refractive power, a middle lens unit having at least one lens unit, and a last lens unit of positive refractive power. In the zoom lens, all the lens units, except the first lens unit and the last lens unit, move during zooming. The third lens unit has at least three lens elements. The following conditions are satisfied:

$$f3/fw > 4.0$$

$$f3/f2 > 2.0$$

$$fw/Bf < 0.8$$

where f2 is a focal length of the second lens unit, f3 is a focal length of the third lens unit, fw is a focal length of the entire zoom lens at a wide-angle end, and Bf is an air-equivalent back focus (an air-conversion length of back-focus).

Further features of the present invention will become apparent from the following description of exemplary embodiments with reference to the attached drawings.

BRIEF DESCRIPTION OF THE DRAWINGS

FIG. 2A and FIG. 2B are aberration diagrams of the zoom lens according to the first exemplary embodiment.

FIG. 4A and FIG. 4B are aberration diagrams of the zoom lens according to the second exemplary embodiment.

DESCRIPTION OF THE EMBODIMENTS

The present invention provides a zoom lens capable of effectively correcting various aberrations during zooming, offering excellent optical performance throughout the zoom range, and suitable for a projector. Zoom lenses according to exemplary embodiments of the present invention will now be described.

A zoom lens according to each exemplary embodiment of the present invention includes, in order from an enlargement conjugate side to a reduction conjugate side, a first lens unit of negative refractive power, a second lens unit of positive refractive power, a third lens unit of positive refractive power, a middle lens unit having at least one lens unit, and a last lens unit of positive refractive power. The first lens unit is closest to the enlargement conjugate side, while the last lens unit is closest to the reduction conjugate side. In other words, the zoom lens of each exemplary embodiment has practically no lens unit other than the first lens unit, second lens unit, third lens unit, middle lens unit, and last lens unit. The enlargement conjugate side may be referred to as front (front side) or screen side. The reduction conjugate side may be referred to as rear (rear side) or panel side (original image side, display device side, or liquid crystal panel side).

If the zoom lens includes five lens units (the first, second, third, fourth, and fifth lens units in order from the enlargement conjugate side), the middle lens unit corresponds to the fourth lens unit (having positive or negative refractive power). If the zoom lens includes six lens units (the first, second, third, fourth, fifth, and sixth lens units), the middle lens unit includes, in order from the enlargement conjugate side to the reduction conjugate side, the fourth lens unit of negative refractive power and the fifth lens unit of positive refractive power. Alternatively, when the zoom lens includes six lens units, both the fourth lens unit and the fifth lens unit may have positive refractive power.

All the lens units, except the first lens unit and the last lens unit, move during zooming. All the moving lens units move toward the enlargement conjugate side during zooming from the wide-angle end to the telephoto end. The second and third lens units perform a zoom function. In particular, the second lens unit performs a primary zoom function. The middle lens unit corrects image plane variation during zooming.

Figure 1:
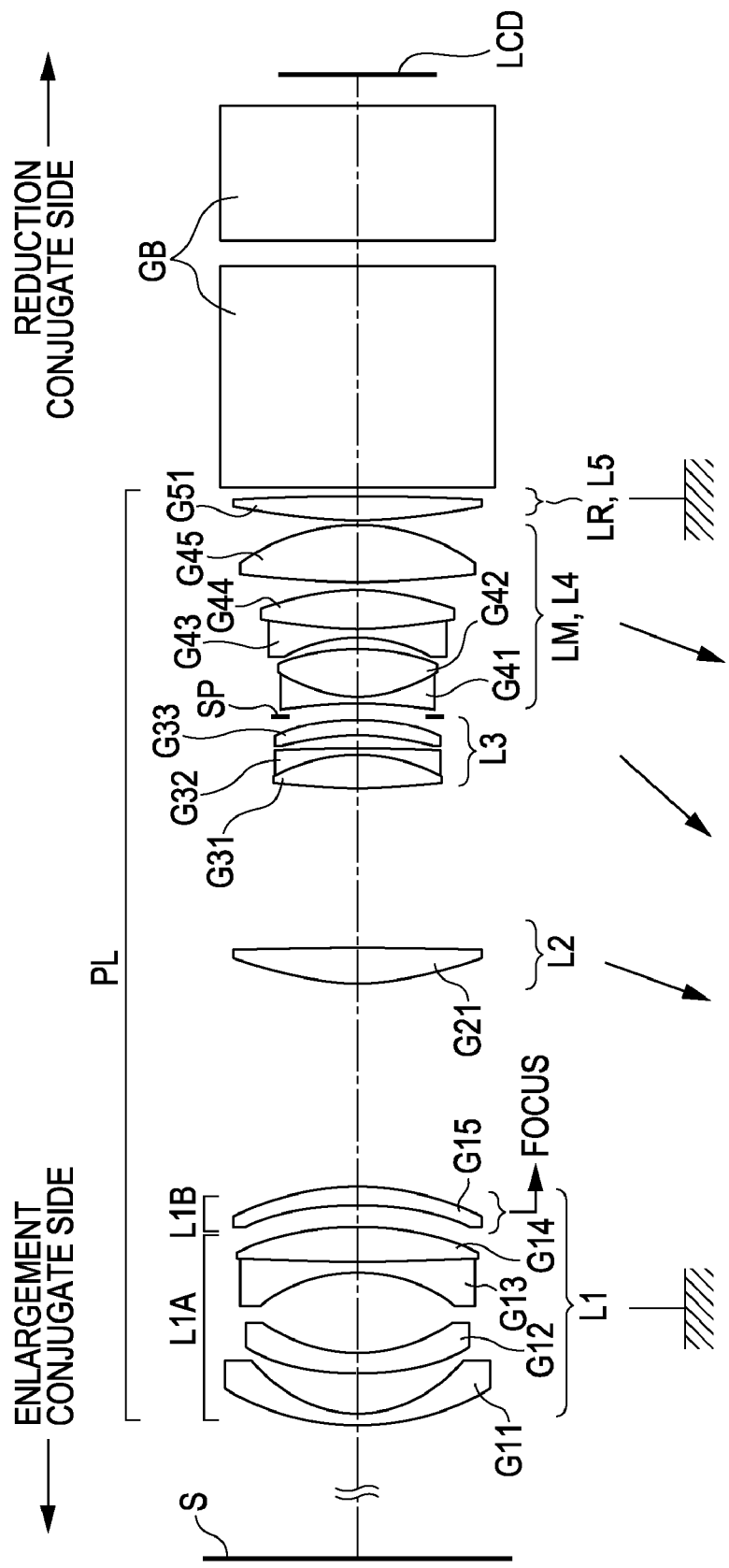
FIG. 1 illustrates a lens configuration at a wide-angle end of a zoom lens according to a first exemplary embodiment of the present invention.

FIG. 1 schematically illustrates a main part of an image projection apparatus (liquid crystal video projector) including a zoom lens according to a first exemplary embodiment of the present invention.

FIG. 2A and FIG. 2B are aberration diagrams showing aberrations at the wide-angle end (short focal length side) and the telephoto end (long focal length side), respectively, of the zoom lens of the first exemplary embodiment when a projection distance (from a first lens unit to a screen) is 2.1 m. In FIG. 2A and FIG. 2B, values in numerical example 1 (described below) corresponding to the first exemplary embodiment are expressed in millimeters (mm).

Figure 3:
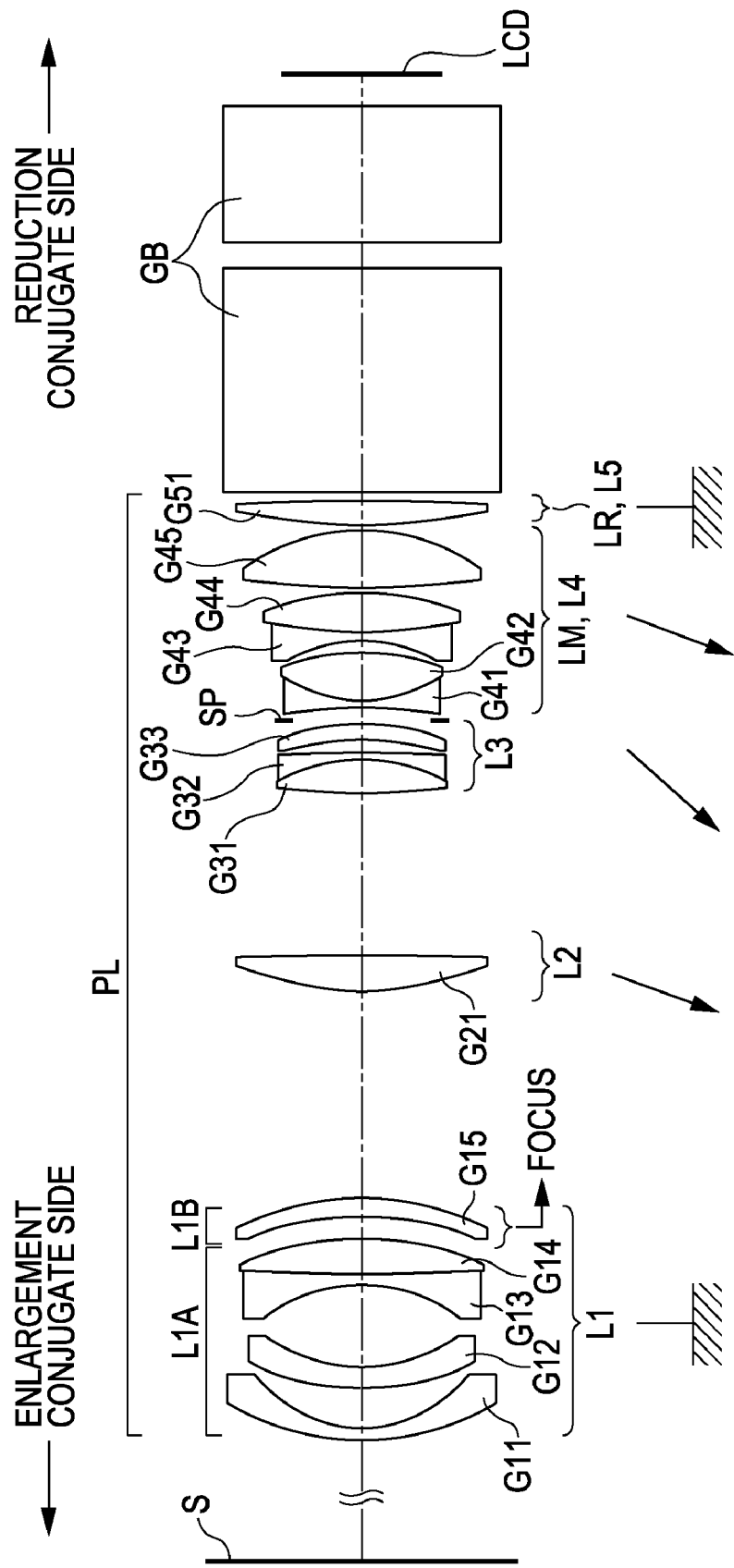
FIG. 3 illustrates a lens configuration at a wide-angle end of a zoom lens according to a second exemplary embodiment of the present invention.

FIG. 3 schematically illustrates a main part of an image projection apparatus including a zoom lens according to a second exemplary embodiment of the present invention.

Figure 4B:
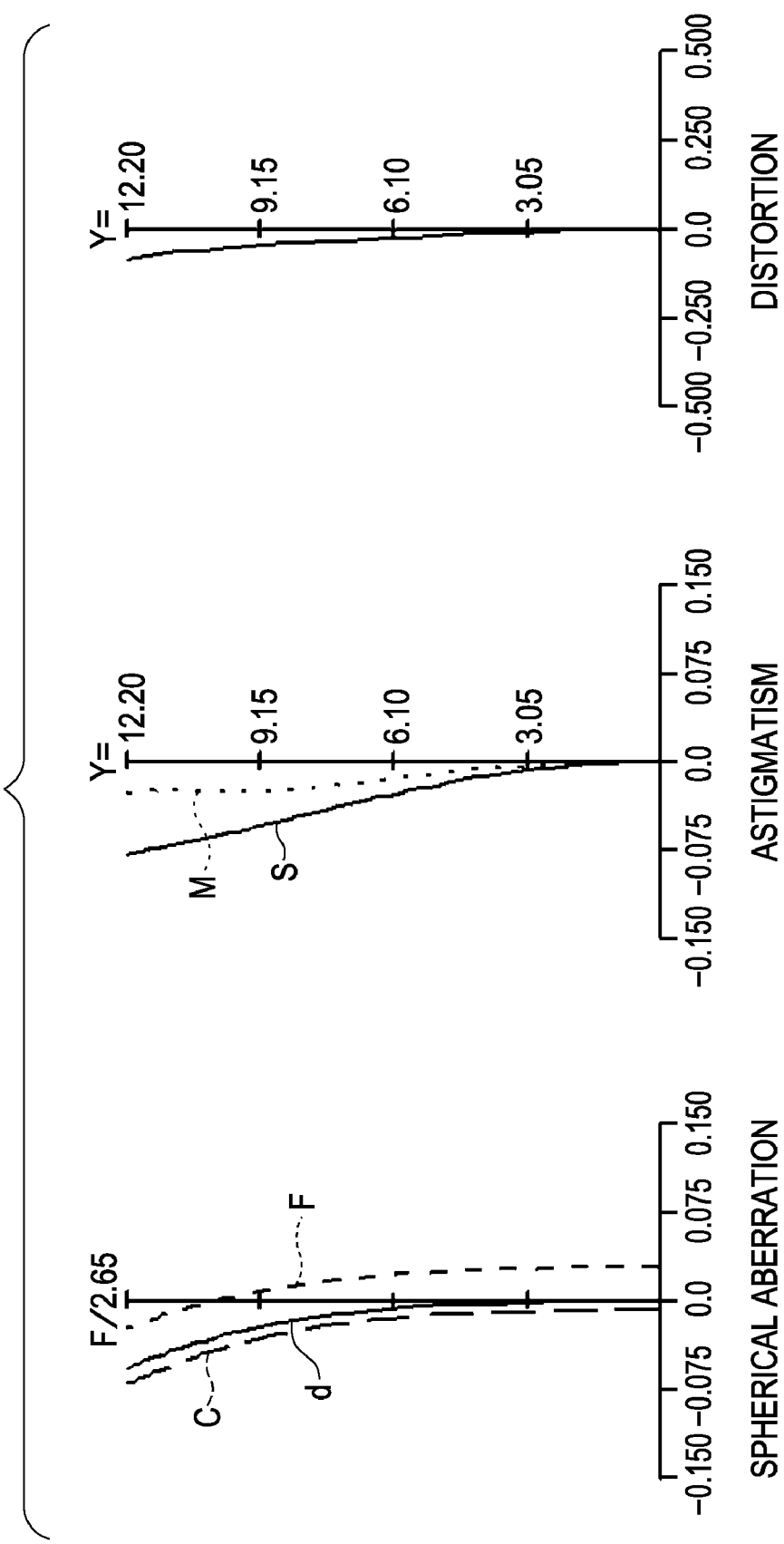

FIG. 4A and FIG. 4B are aberration diagrams showing aberrations at the wide-angle end and the telephoto end, respectively, of the zoom lens of the second exemplary embodiment when a projection distance is 2.1 m. In FIG. 4A and FIG. 4B, values in numerical example 2 (described below) corresponding to the second exemplary embodiment are expressed in mm.

Figure 5:
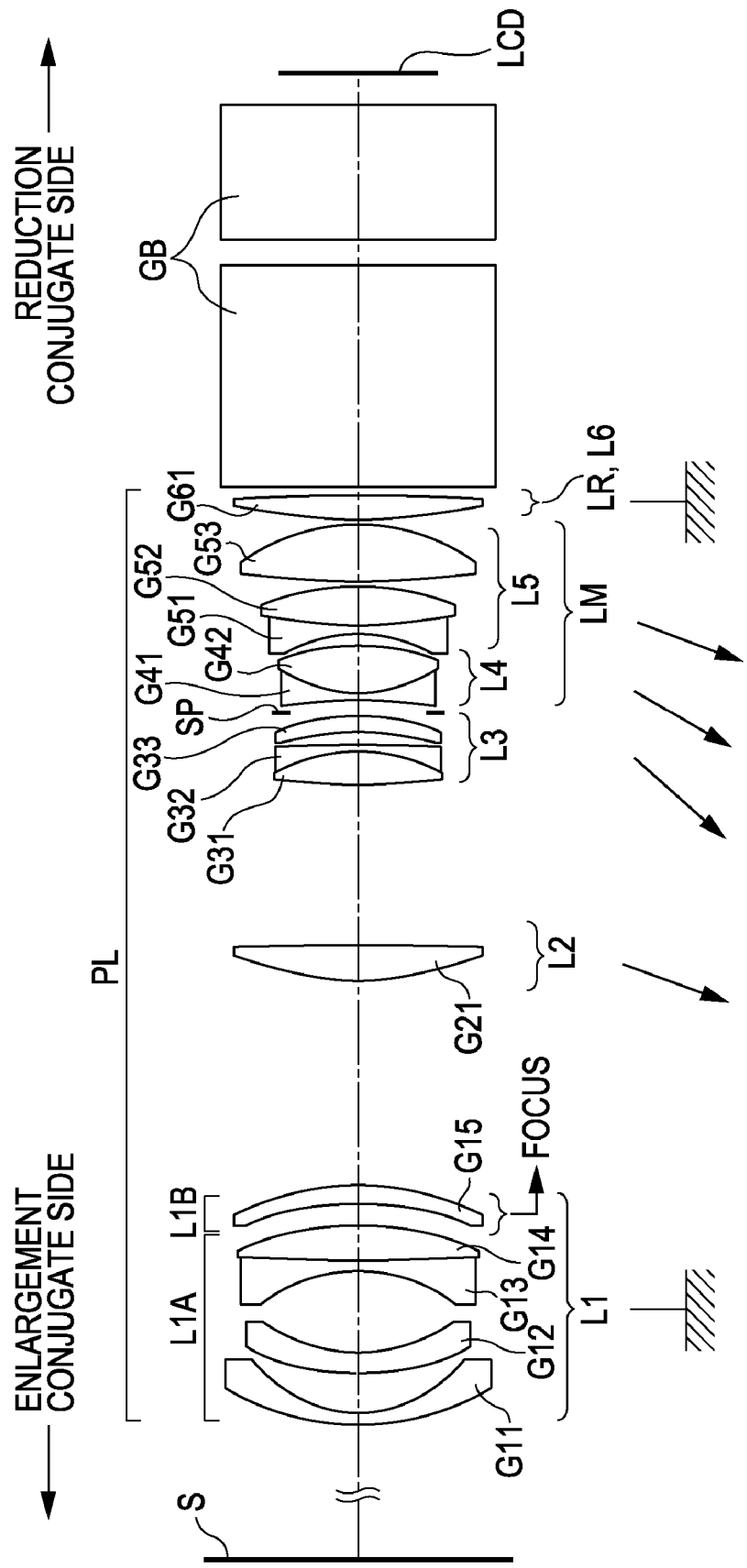
FIG. 5 illustrates a lens configuration at a wide-angle end of a zoom lens according to a third exemplary embodiment of the present invention.

FIG. 5 schematically illustrates a main part of an image projection apparatus including a zoom lens according to a third exemplary embodiment of the present invention.

Figure 6A:
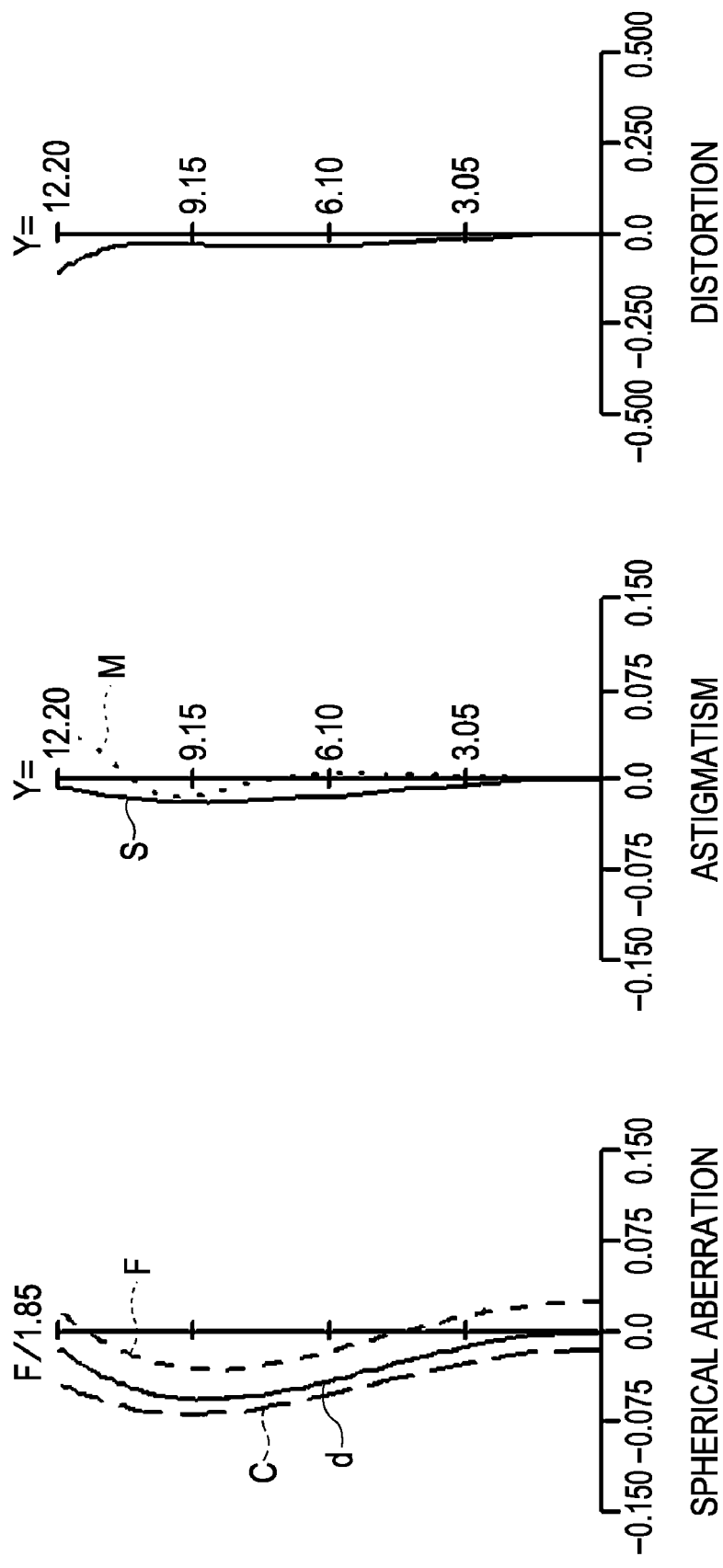
FIG. 6A and FIG. 6B are aberration diagrams of the zoom lens according to the third exemplary embodiment.
Figure 6B:
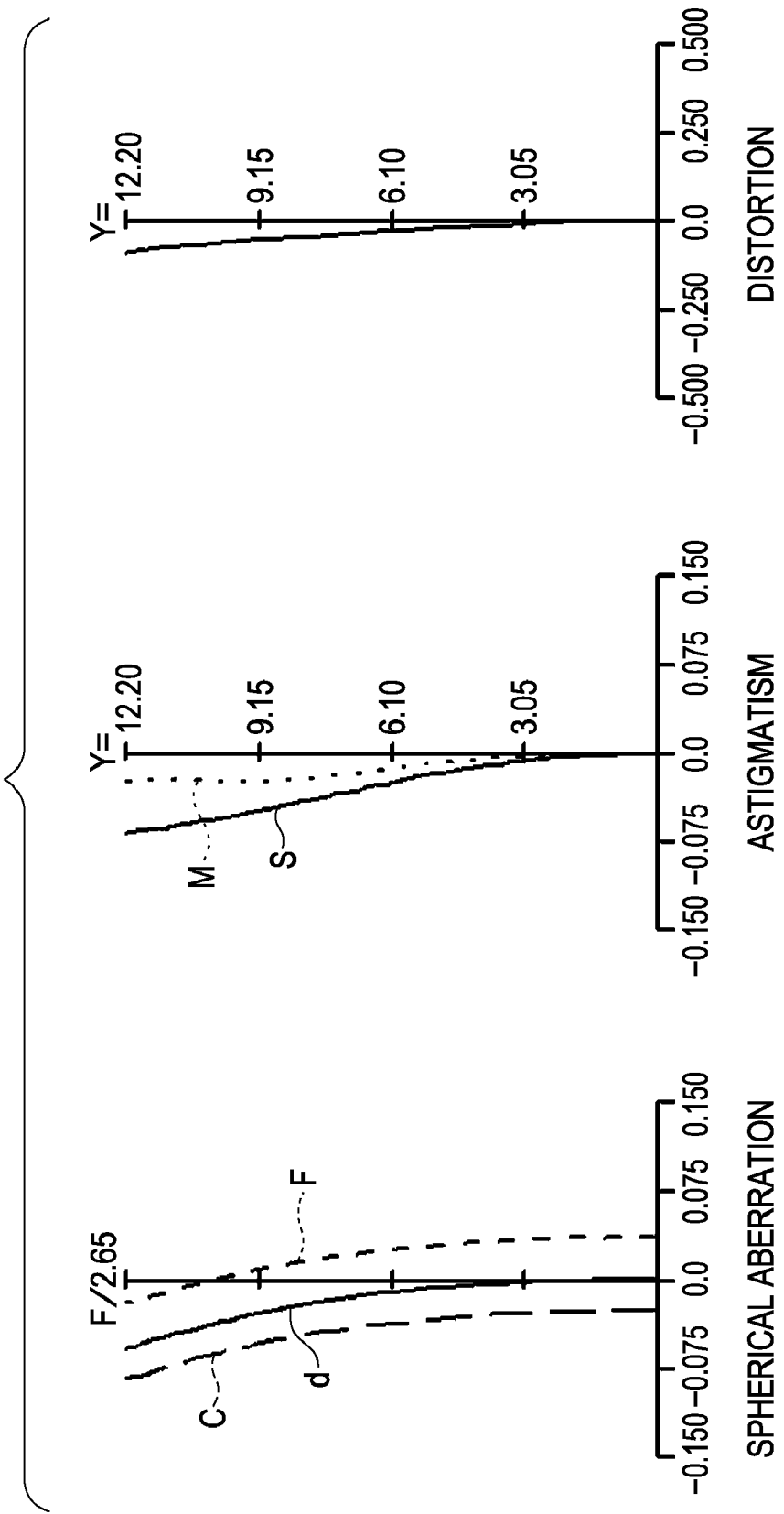

FIG. 6A and FIG. 6B are aberration diagrams showing aberrations at the wide-angle end and the telephoto end, respectively, of the zoom lens of the third exemplary embodiment when a projection distance is 2.1 m. In FIG. 6A and FIG. 6B, values in numerical example 3 (described below) corresponding to the third exemplary embodiment are expressed in mm.

Figure 7:
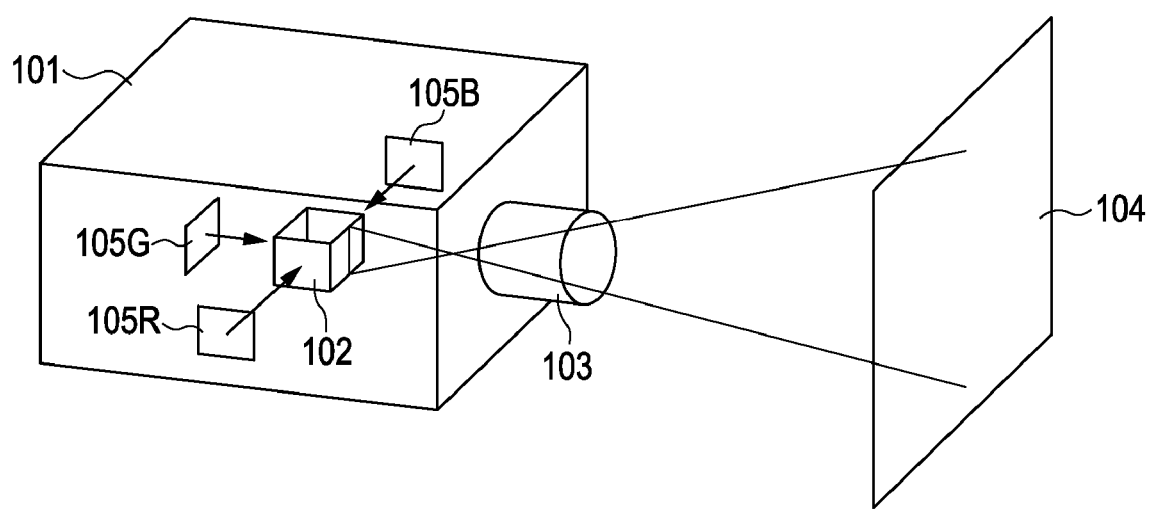
FIG. 7 schematically illustrates a main part of an image projection apparatus according to an exemplary embodiment of the present invention.

FIG. 7 schematically illustrates a main part of an image projection apparatus according to an exemplary embodiment of the present invention.

In the image projection apparatus illustrated in FIGS. 1, 3, and 5, a zoom lens (projection lens) PL enlarges and projects an original image LCD (on a display device or liquid crystal panel) onto a screen surface S serving as a projection surface. In FIGS. 1, 3, and 5, an arrow under a lens unit indicates both the direction and amount of movement of the lens unit during zooming from the wide-angle end (wide end) to the telephoto end (tele-end). The greater the inclination of the arrow relative to the vertical direction, the greater the amount of movement of the lens unit from the wide-angle end to the telephoto end.

Reference character i denotes the order of the lens unit from the enlargement conjugate side. Reference character Li denotes the i-th lens unit.

Reference character L1 denotes a first lens unit of negative refractive power, reference character L2 denotes a second lens unit of positive refractive power, reference character L3 denotes a third lens unit of positive refractive power, reference character LM denotes a middle lens unit including at least one lens unit, and reference character LR denotes a last lens unit of positive refractive power.

Reference character S denotes a screen surface (projection surface, enlargement conjugate surface, or enlargement-side conjugate position), reference character LCD denotes an original image (projected image) on a liquid crystal panel (liquid crystal display device, reduction conjugate surface, or reduction-side conjugate position). The screen surface S and the original image LCD have a conjugate relationship or substantially conjugate relationship therebetween. Generally, the screen surface S corresponds to a conjugate point (enlargement conjugate point or front side) having a longer distance, while the original image LCD corresponds to a conjugate point (reduction conjugate point or rear side) having a shorter distance. When the zoom lens is used as a photographing system, the screen surface S corresponds to an object side and the original image LCD corresponds to an image side.

Reference character GB denotes a glass block (prism) provided for optical design purposes and corresponding to a color synthesis prism, polarizing filter, color filter, and the like.

The zoom lens PL is mounted on a projector main body (not shown) with a connecting member (not shown) interposed therebetween. The glass block GB and other components upstream of the zoom lens PL and adjacent to the display device LCD are contained in the projector main body.

The zoom lenses of the first to third exemplary embodiments have F-numbers in the 1.85 to 2.65 range. Each of the zoom lenses projects image information (display image) onto the screen surface S at a projection distance of 2.1 m (when values in the corresponding numerical example are expressed in mm).

In the aberration diagrams of FIGS. 2A, 2B, 4A, 4B, 6A, and 6B, a curve d represents aberration at d-line (587.6 nm), a curve F represents aberration at F-line (486.1 nm), and a curve C represents aberration at C-line (656.3 nm).

Also, in FIGS. 2A, 2B, 4A, 4B, 6A, and 6B, a curve S (tilt of a sagittal image plane) and a curve M (tilt of a meridional image plane) both represent aberration at a wavelength of 550 nm, F indicates an F-number, and Y indicates an image height (image height on the projected side).

In each exemplary embodiment, the second lens unit L2 serves as a primary zoom lens unit. The third lens unit L3 has refractive power smaller than that of the second lens unit L2.

It is desirable that the third lens unit L3 include at least three lens elements. In the first, second, and third exemplary embodiments described below, the third lens unit L3 includes, in order from the enlargement conjugate side, a positive lens element G31, a negative lens element G32, and a positive lens element G33 (two lens elements on the enlargement conjugate side constitute a cemented lens component). However, the lens configuration of the third lens unit L3 is not limited to this. For example, the third lens unit L3 may include four or five lens elements. More specifically, the positive lens element G33 closest to the reduction conjugate side may be replaced with a cemented lens component formed by cementing together a positive lens element and a negative lens element. Alternatively, another positive or negative lens element may be added to the reduction conjugate side (or enlargement conjugate side) of the positive lens element G33.

The following conditions are satisfied:

$$f3/fw > 4.0 \quad (1)$$

$$f3/f2 > 2.0 \quad (2)$$

$$fw/Bf < 0.8 \quad (3)$$

where f2 is a focal length of the second lens unit L2, f3 is a focal length of the third lens unit L3, fw is a focal length of the entire zoom lens at the wide-angle end, and Bf is an air-conversion length of back-focus (i.e., an air-conversion length from the lens surface closest to the reduction conjugate side to the reduction conjugate position). When light passes through material (lens material) having a refractive index greater than 1, the term air-conversion length refers to a value obtained by dividing the length of the optical path in the material by the refractive index of the material.

Condition (1) is for appropriately defining the refractive power of the third lens unit L3. Condition (2) is for appropriately defining the ratio of the refractive power of the third lens unit L3 to that of the second lens unit L2. Thus, it is possible to effectively achieve a predetermined zoom ratio while suppressing an increase in total length of the zoom lens. At the same time, it is possible to reduce aberration variation and provide a high level of optical performance throughout the zoom range.

In particular, as indicated by condition (2), the refractive power of the third lens unit L3 is made smaller than that of the second lens unit L2 and thus, aberration variation during zooming is reduced.

If the refractive power of the third lens unit L3 is greater than that defined by conditions (1) and (2), the amount of movement of the third lens unit L3 during zooming is reduced and the total length of the zoom lens is reduced. However, this causes an increase in aberration variation during zooming and makes it difficult to provide a high level of optical performance throughout the zoom range. At the same time, since the refractive power of the second lens unit L2 is too small, the amount of movement of the second lens unit L2 during zooming is increased. This is undesirable in that the total length of the zoom lens is increased.

If the upper limit of condition (3) is exceeded, the back focus of the zoom lens is too short. This causes less space for arranging, on the reduction conjugate side of the zoom lens, a mirror tilted to the optical axis, a prism, and the like.

As described above, in the first, second, and third exemplary embodiments, it is possible to provide a zoom lens having a long back focus, offering a high degree of telecentricity and excellent image-forming performance, and suitable for a projector.

In the first, second, and third exemplary embodiments, it is more preferable that the following conditions be satisfied. Satisfying the following conditions is not necessarily required for the present invention, but can add substantial value to the present invention.

If the zoom lens includes five lens units, it is preferable that the following condition be satisfied:

$$|f4/fw| > 15 \quad (4)$$

where f4 is a focal length of a fourth lens unit L4.

The first lens unit L1 includes an aspherical lens element having an aspherical surface. It is preferable that at least one of the following conditions be satisfied:

$$|f1/fw| > 1.0 \quad (5)$$

$$fASP/f1 < 3.0 \quad (6)$$

where f1 is a focal length of the first lens unit L1 and fASP is a focal length of the aspherical lens element.

Condition (4) is for the zoom lens including five lens units. If the refractive power of the fourth lens unit L4 is too strong to satisfy condition (4), aberration variation during zooming increases and thus, it is difficult to provide a high level of optical performance throughout the zoom range.

Condition (5) is for appropriately defining the negative refractive power of the first lens unit L1, ensuring a predetermined back focus distance, reducing the occurrence of negative distortion, and effectively achieving a wider field angle. It is not preferable that condition (5) be not satisfied, because the degree of negative distortion increases and the projected image will be distorted at the wide-angle end.

Condition (6) is for appropriately defining the negative refractive power of the aspherical lens element in the first lens unit L1, effectively correcting various aberrations, and reducing the occurrence of negative distortion at the wide-angle end, as in the case of condition (5). It is not preferable that condition (6) be not satisfied, because the degree of negative distortion increases and the projected image will be distorted at the wide-angle end.

In the first, second, and third exemplary embodiments, it is more preferable that the numerical ranges of conditions (1) to (6) be defined as follows:

$$f3/fw > 6.0 \quad (1a)$$

$$f3/f2 > 3.0 \quad (2a)$$

$$fw/Bf < 0.6 \quad (3a)$$

$$|f4/fw| > 50 \quad (4a)$$

$$|f1/fw| > 1.5 \quad (5a)$$

$$fASP/f1 < 2.5 \quad (6a)$$

The above conditions (1a) to (6a) may be modified as follows:

$$f3/fw > 11.0 \quad (1b)$$

$$f3/f2 > 4.0 \quad (2b)$$

$$fw/Bf < 0.52 \quad (3b)$$

$$|f4/fw51| > 120 \quad (4b)$$

$$|f1/fw| > 1.9 \quad (5b)$$

$$fASP/f1 < 2.2 \quad (6b)$$

It is still more preferable that the following conditions be satisfied:

$$50.0 (\text{more preferably } 20.0) > f3/fw \quad (1c)$$

$$12.0 (\text{more preferably } 6.0) > f3/f2 \quad (2c)$$

$$0.28 (\text{more preferably } 0.40) < fw/Bf \quad (3c)$$

$$8000 (\text{more preferably } 6000) > |f4/fw| \quad (4c)$$

$$4.0 (\text{more preferably } 2.5) > |f1/fw| \quad (5c)$$

$$1.1 (\text{more preferably } 1.7) < fASP/f1 \quad (6c)$$

Next, the zoom lens of each exemplary embodiment will be described in detail.

In the first exemplary embodiment illustrated in FIG. 1, there are provided the first lens unit L1 of negative refractive power, the second lens unit L2 of positive refractive power, the third lens unit L3 of positive refractive power, the fourth lens unit L4 of positive refractive power, and the fifth lens unit L5 of positive refractive power.

The first lens unit L1 includes a first lens sub-unit L1A of negative refractive power and a first lens sub-unit L1B of positive refractive power. The first lens sub-unit L1B serves as a focus lens. The fourth lens unit L4 corresponds to the middle lens unit LM. The fifth lens unit L5 corresponds to the last lens unit LR.

In the first exemplary embodiment, during zooming from the wide-angle end to the telephoto end, the second lens unit L2, the third lens unit L3, and the fourth lens unit L4 are independently moved toward the screen surface S on the enlargement conjugate side (front side) as indicated by arrows. The second lens unit L2 and the third lens unit L3 perform zooming, while the fourth lens unit L4 corrects image plane variation during zooming.

In the first exemplary embodiment, the second lens unit L2 performs a primary zoom function. The same applies to the second and third exemplary embodiments described below.

The first lens unit L1 and the fifth lens unit L5 do not move for zooming. In the first lens unit L1, the first lens sub-unit L1B having positive refractive power and disposed closest to the reduction conjugate side is moved along the optical axis for focusing. The first lens sub-unit L1A does not move during focusing.

With the zooming and focusing methods described above, the total length of the zoom lens (i.e., the distance from the first lens surface to the last lens surface) can be kept constant (unchanged) even during zooming and focusing. Thus, the robustness of the lens barrel structure can be improved.

An aperture stop SP is located between the third lens unit L3 and the fourth lens unit L4. During zooming, the aperture stop SP moves together with the third lens unit L3. Each lens surface is covered with a multilayer antireflective coating.

In the first exemplary embodiment, the first lens sub-unit L1A includes, in order from the enlargement conjugate side (front) to the reduction conjugate side (rear), a negative lens element G11 having a meniscus shape convex toward the front, a negative lens element G12 having a meniscus shape and being aspherical on both sides, a negative lens element G13, and a positive lens element G14. The negative lens element G13 and the positive lens element G14 are cemented together. The first lens sub-unit L1B is constituted by a positive lens element G15 having a meniscus shape convex toward the rear.

The negative lens element G12 has aspherical surfaces on both sides to suppress the occurrence of negative distortion.

In the first exemplary embodiment, the first lens sub-unit L1B on the reduction conjugate side (rear side) of the first lens unit L1 performs focusing. Therefore, a curvature of field typical of a retrofocus configuration can be prevented from varying depending on the projection distance (from the lens surface closest to the enlargement conjugate side to the screen S). Thus, a high level of optical performance can be maintained throughout the entire projection distance.

The second lens unit L2 is constituted by a biconvex positive lens element G21.

The third lens unit L3 includes a cemented lens component formed by cementing together the positive lens element G31 having a biconvex shape and the negative lens element G32, and the positive lens element G33 having a meniscus shape convex toward the rear. With this configuration of the third lens unit L3, it is possible to reduce variation in longitudinal chromatic aberration during zooming, reduce impact on off-axis aberrations, and effectively correct spherical aberration. Thus, a high level of optical performance can be achieved throughout the zoom range.

The fourth lens unit L4 includes a cemented lens component formed by cementing together a biconcave negative lens element G41 and a biconvex positive lens element G42, another cemented lens component formed by cementing together a biconcave negative lens element G43 and a positive lens element G44, and a biconvex positive lens element G45.

The fifth lens unit L5 is constituted by a biconvex positive lens element G51. The fifth lens unit L5, which is the last lens unit LR, has positive refractive power. Thus, telecentricity on the reduction conjugate side can be improved.

In the second exemplary embodiment illustrated in FIG. 3, there are provided the first lens unit L1 of negative refractive power, the second lens unit L2 of positive refractive power, the third lens unit L3 of positive refractive power, the fourth lens unit L4 of negative refractive power, and the fifth lens unit L5 of positive refractive power.

The second exemplary embodiment has the same configuration as that of the first exemplary embodiment except that the fourth lens unit L4 has negative refractive power.

In the third exemplary embodiment illustrated in FIG. 5, there are provided the first lens unit L1 of negative refractive power, the second lens unit L2 of positive refractive power, the third lens unit L3 of positive refractive power, the fourth lens unit L4 of negative refractive power, the fifth lens unit L5 of positive refractive power, and a sixth lens unit L6 of positive refractive power.

The first lens unit L1 includes the first lens sub-unit L1A of negative refractive power and the first lens sub-unit L1B of positive refractive power. The first lens sub-unit L1B serves as a focus lens. The fourth lens unit L4 and the fifth lens unit L5 correspond to the middle lens unit LM. The sixth lens unit L6 corresponds to the last lens unit LR.

In the third exemplary embodiment, during zooming from the wide-angle end to the telephoto end, the second lens unit L2, the third lens unit L3, the fourth lens unit L4, and the fifth lens unit L5 are independently moved toward the screen surface S on the enlargement conjugate side as indicated by arrows.

Thus, by moving the four lens units during zooming, a predetermined zoom ratio can be easily obtained and aberration variation during zooming can be reduced.

The first lens unit L1 and the sixth lens unit L6 do not move for zooming. In the first lens unit L1, the first lens sub-unit L1B having positive refractive power and disposed closest to the reduction conjugate side is moved along the optical axis for focusing. The first lens sub-unit L1A does not move for focusing.

The aperture stop SP is located between the third lens unit L3 and the fourth lens unit L4. During zooming, the aperture stop SP moves together with the third lens unit L3. Each lens surface is covered with a multilayer antireflective coating.

In the third exemplary embodiment, the lens configuration of the first, second, and third lens units L1, L2, and L3 is the same as that in the case of the first exemplary embodiment. The fourth lens unit L4 of the third exemplary embodiment is constituted by a cemented lens component formed by cementing together the biconcave negative lens element G41 and the biconvex positive lens element G42. The fifth lens unit L5 includes a cemented lens component formed by cementing together a biconcave negative lens element G51 and a biconvex positive lens element G52, and a biconvex positive lens element G53. The sixth lens unit L6 is constituted by a biconvex positive lens element G61.

In the third exemplary embodiment, where the zoom lens PL includes the first to sixth lens units L1 to L6, f4 is a combined focal length of the middle lens unit LM (the fourth and fifth lens units L4 and L5) at the wide-angle end. In the first and second exemplary embodiments, where the zoom lens PL includes five lens units, the middle lens unit LM corresponds to the fourth lens unit L4. In the third exemplary embodiment, where the zoom lens PL includes six lens units, the middle lens unit LM corresponds to the fourth and fifth lens units L4 and L5. If the zoom lens PL includes seven or more lens units, all lens units disposed on the rear side (reduction conjugate side) of the third lens unit L3 and on the front side (enlargement conjugate side) of the last lens unit LR (closest to the reduction conjugate side) correspond to the middle lens unit LM. That is, all lens units disposed on the rear side (reduction conjugate side) of the third lens unit L3 (i.e., the third lens unit from the enlargement conjugate side) and on the front side (enlargement conjugate side) of the last lens unit LR are included in the middle lens unit LM.

With the configuration of any of the exemplary embodiments described above, it is possible to provide a zoom lens offering a high level of optical performance throughout the zoom range and suitable for a projector.

FIG. 7 schematically illustrates a main part of an image projection apparatus according to an exemplary embodiment of the present invention.

FIG. 7 illustrates an example in which the zoom lens of any one of the above-described exemplary embodiments is used as a projection lens 103 for a liquid crystal projector (image projection apparatus). In this liquid crystal projector, image information corresponding to a plurality of color light beams based on a plurality of (three) liquid crystal display devices is synthesized by a color synthesizing unit and enlarged and projected by the projection lens 103 onto a screen (predetermined surface) 104.

In a color liquid crystal projector 101 illustrated in FIG. 7, red, green, and blue (RGB) color light beams from corresponding three liquid crystal panels (liquid crystal display devices) 105R, 105G, and 105B are synthesized into one optical path by a prism 102 serving as a color synthesizing unit. The liquid crystal panels 105R, 105G, and 105B may either be of transmissive or reflective type. The prism 102 may include a plurality of optical elements (e.g., dichroic mirror, dichroic prism, and polarizing beam splitter) and may further include a polarizer and a wave plate between adjacent optical elements.

If condition (3) is satisfied in the color liquid crystal projector 101, a large image can be projected onto the screen 104 with a relatively short projection distance (from the lens surface closest to the enlargement conjugate side to the screen 104) and a long back focus can be ensured. Therefore, a prism, a polarizer, and the like can be spaced out sufficiently for cooling. Conversely, if the upper limit of condition (3) is exceeded, the projection distance may be too long or distances between adjacent components (e.g., prism block and polarizer) disposed on the reduction conjugate side may be too short for cooling.

Next, there will be shown numerical examples 1 to 3 corresponding to the first to third exemplary embodiments, respectively. In numerical examples 1 to 3, i indicates the order of the optical surface from the enlargement side (front side), ri indicates the radius of curvature of the i-th optical surface (i-th surface), di indicates the distance between the i-th surface and the (i+1)-th surface, ni and vi indicate the refractive index and Abbe number, respectively, of the material of the i-th optical member with respect to the d-line, and f indicates a focal length. A number marked with z indicates a distance that varies during zooming. An optical surface marked with * is an aspherical surface. Additionally, for example, "e-Z" means "$10^{-Z}$".

In numerical examples 1 to 3, the four rearmost surfaces are surfaces of the glass block GB.

An aspherical shape is expressed as follows:

$$x=(h^2/R)/[1+[1-(1+k)(h/R)^2]^{1/2}]+Ah^4+Bh^6+Ch^8+Dh^{10}+Eh^{12}$$

where, with respect to a surface vertex, x is the amount of displacement in the direction of the optical axis at a height of h from the optical axis; R is a paraxial radius of curvature; k is a conical constant; and A, B, C, D, and E are aspherical coefficients.

The relationship of conditions 1 to 6 and numerical examples 1 to 3 will be shown in Table 1.

NUMERICAL EXAMPLE 1

| | f = 21.8~31.9 (zoom ratio 1.47) ω = 29.2°~20.9° F/1.85~F/2.65 | | | |
|---|---|---|---|---|
| | r | d | nd | vd |
| OBJ | ∞ | 2100.00 | | |
| 1 | 40.139 | 2.00 | 1.805 | 25.4 |
| 2 | 20.639 | 6.23 | | |
| 3* | 70.343 | 3.20 | 1.529 | 55.8 |
| 4* | 27.417 | 12.41 | | |
| 5 | −24.445 | 1.70 | 1.487 | 70.2 |
| 6 | 320.652 | 5.45 | 1.800 | 34.9 |
| 7 | −46.628 | 3.40 | | |
| 8 | −47.281 | 2.85 | 1.834 | 37.1 |
| 9 | −40.415 | 31.87z | | |
| 10 | 52.358 | 5.20 | 1.834 | 37.1 |
| 11 | −669.376 | 25.31z | | |
| 12 | 169.454 | 4.80 | 1.487 | 70.2 |
| 13 | −27.165 | 1.20 | 1.806 | 33.2 |
| 14 | −173.752 | 1.94 | | |
| 15 | −44.559 | 2.65 | 1.805 | 25.4 |
| 16 | −32.271 | 0.50 | | |
| 17 | aperture stop | 1.92z | | |
| 18 | −81.130 | 1.20 | 1.800 | 34.9 |
| 19 | 22.436 | 7.30 | 1.589 | 61.1 |
| 20 | −34.006 | 1.80 | | |
| 21 | −22.432 | 1.30 | 1.800 | 34.9 |
| 22 | 66.267 | 6.10 | 1.487 | 70.2 |
| 23 | −38.768 | 1.22 | | |
| 24 | 143.991 | 8.90 | 1.496 | 81.5 |
| 25 | −30.799 | 0.70z | | |
| 26 | 84.252 | 3.85 | 1.805 | 25.4 |
| 27 | −290.436 | 1.30 | | |
| 28 | ∞ | 34.60 | 1.516 | 64.1 |
| 29 | ∞ | 4.00 | | |
| 30 | ∞ | 21.00 | 1.805 | 25.4 |
| 31 | ∞ | | | |

| | W | M | T |
|---|---|---|---|
| d9 | 31.87 | 20.11 | 7.35 |
| d11 | 25.31 | 23.40 | 14.29 |
| d17 | 1.92 | 7.61 | 22.16 |
| d25 | 0.70 | 8.68 | 16.00 |

| | z4 | z5 | z6 | z7 |
|---|---|---|---|---|
| d0 | 1200.00 | 8700.00 | 1200.00 | 8700.00 |
| d7 | 4.27 | 2.50 | 4.27 | 2.50 |
| d9 | 31.01 | 32.78 | 6.48 | 8.25 |

| | K | A | B | C | D | E |
|---|---|---|---|---|---|---|
| 3 | 0.000e+000 | 2.994e−005 | −8.530e−008 | 2.529e−010 | −3.394e−013 | 1.099e−016 |
| 4 | 0.000e+000 | 2.050e−005 | −9.984e−008 | 1.809e−010 | −1.919e−014 | −8.454e−016 |

NUMERICAL EXAMPLE 2

| | f = 21.8~31.9 (zoom ratio 1.47) ω = 29.2°~20.9° F/1.85~F/2.65 | | | |
|---|---|---|---|---|
| | r | d | nd | vd |
| OBJ | ∞ | 2100.00 | | |
| 1 | 39.964 | 2.00 | 1.805 | 25.4 |
| 2 | 20.625 | 6.39 | | |
| 3* | 70.343 | 3.20 | 1.529 | 55.8 |
| 4* | 27.417 | 12.33 | | |
| 5 | −24.762 | 1.70 | 1.487 | 70.2 |
| 6 | 268.348 | 5.58 | 1.800 | 34.9 |
| 7 | −48.704 | 3.47 | | |

-continued

| f = 21.8~31.9 (zoom ratio 1.47) ω = 29.2°~20.9° F/1.85~F/2.65 | | | | |
|---|---|---|---|---|
| 8 | −49.535 | 3.09 | 1.834 | 37.1 |
| 9 | −41.449 | 31.81z | | |
| 10 | 51.526 | 5.09 | 1.834 | 37.1 |
| 11 | −1038.197 | 25.25z | | |
| 12 | 101.164 | 4.92 | 1.487 | 70.2 |
| 13 | −29.190 | 1.20 | 1.806 | 33.2 |
| 14 | −591.118 | 2.05 | | |
| 15 | −49.409 | 2.80 | 1.805 | 25.4 |
| 16 | −33.951 | 0.50 | | |
| 17 | aperture stop | 1.89z | | |
| 18 | −81.200 | 1.20 | 1.800 | 34.9 |
| 19 | 22.137 | 7.21 | 1.589 | 61.1 |
| 20 | −35.930 | 1.93 | | |
| 21 | −22.287 | 1.30 | 1.800 | 34.9 |
| 22 | 69.202 | 6.18 | 1.487 | 70.2 |
| 23 | −37.236 | 0.61 | | |
| 24 | 137.580 | 8.77 | 1.496 | 81.5 |
| 25 | −30.718 | 0.70z | | |
| 26 | 88.953 | 3.85 | 1.805 | 25.4 |
| 27 | −229.280 | 1.30 | | |
| 28 | ∞ | 34.60 | 1.516 | 64.1 |
| 29 | ∞ | 4.00 | | |
| 30 | ∞ | 21.00 | 1.805 | 25.4 |
| 31 | ∞ | | | |

| | W | M | T |
|---|---|---|---|
| d9 | 31.81 | 20.09 | 7.36 |
| d11 | 25.25 | 23.25 | 14.24 |
| d17 | 1.89 | 7.74 | 22.18 |
| d25 | 0.70 | 8.58 | 15.86 |

| | z4 | z5 | z6 | z7 |
|---|---|---|---|---|
| d0 | 1200.00 | 8700.00 | 1200.00 | 8700.00 |
| d7 | 4.26 | 2.64 | 4.26 | 2.64 |
| d9 | 31.02 | 32.64 | 6.57 | 8.19 |

| | K | A | B | C | D | E |
|---|---|---|---|---|---|---|
| 3 | 0.000e+000 | 2.994e−005 | −8.530e−008 | 2.529e−010 | −3.394e−013 | 1.099e−016 |
| 4 | 0.000e+000 | 2.050e−005 | −9.984e−008 | 1.809e−010 | −1.919e−014 | −8.454e−016 |

NUMERICAL EXAMPLE 3

| f = 21.8~31.9 (zoom ratio 1.47) ω = 29.2°~20.9° F/1.85~F/2.65 | | | | |
|---|---|---|---|---|
| | r | d | nd | νd |
| OBJ | ∞ | 2100.00 | | |
| 1 | 40.155 | 2.00 | 1.805 | 25.4 |
| 2 | 20.604 | 6.48 | | |
| 3* | 70.343 | 3.20 | 1.529 | 55.8 |
| 4* | 27.417 | 12.04 | | |
| 5 | −24.965 | 1.70 | 1.487 | 70.2 |
| 6 | 201.643 | 5.61 | 1.800 | 34.9 |
| 7 | −49.877 | 3.40 | | |
| 8 | −51.434 | 3.04 | 1.834 | 37.1 |
| 9 | −42.602 | 31.80z | | |
| 10 | 52.101 | 5.09 | 1.834 | 37.1 |
| 11 | −817.882 | 25.45z | | |
| 12 | 99.407 | 4.87 | 1.487 | 70.2 |
| 13 | −29.364 | 1.20 | 1.806 | 33.2 |
| 14 | −645.940 | 2.02 | | |
| 15 | −50.174 | 2.70 | 1.805 | 25.4 |
| 16 | −34.227 | 0.50 | | |
| 17 | aperture stop | 1.86z | | |
| 18 | −74.947 | 1.20 | 1.800 | 34.9 |
| 19 | 22.829 | 7.18 | 1.589 | 61.1 |
| 20 | −35.999 | 2.00z | | |

-continued

| f = 21.8~31.9 (zoom ratio 1.47) ω = 29.2°~20.9° F/1.85~F/2.65 | | | | |
|---|---|---|---|---|
| 21 | −22.268 | 1.30 | 1.800 | 34.9 |
| 22 | 72.709 | 6.44 | 1.487 | 70.2 |
| 23 | −35.549 | 0.64 | | |
| 24 | 151.375 | 8.75 | 1.496 | 81.5 |
| 25 | −30.807 | 0.70z | | |
| 26 | 82.937 | 3.85 | 1.805 | 25.4 |
| 27 | −299.797 | 1.30 | | |
| 28 | ∞ | 34.60 | 1.516 | 64.1 |
| 29 | ∞ | 4.00 | | |
| 30 | ∞ | 21.00 | 1.805 | 25.4 |
| 31 | ∞ | | | |

| | W | M | T |
|---|---|---|---|
| d9 | 31.80 | 19.21 | 7.38 |
| d11 | 25.45 | 22.88 | 14.42 |
| d17 | 1.86 | 8.26 | 21.71 |
| d20 | 2.00 | 2.11 | 2.49 |
| d25 | 0.70 | 9.34 | 15.80 |

| | z4 | z5 | z6 | z7 |
|---|---|---|---|---|
| d0 | 1200.00 | 8700.00 | 1200.00 | 8700.00 |
| d7 | 4.19 | 2.57 | 4.19 | 2.57 |
| d9 | 31.01 | 32.63 | 6.58 | 8.20 |

| | K | A | B | C | D | E |
|---|---|---|---|---|---|---|
| 3 | 0.000e+000 | 2.994e−005 | −8.530e−008 | 2.529e−010 | −3.394e−013 | 1.099e−016 |
| 4 | 0.000e+000 | 2.050e−005 | −9.984e−008 | 1.809e−010 | −1.919e−014 | −8.454e−016 |

| | Numerical Example | | |
|---|---|---|---|
| Condition | 1 | 2 | 3 |
| (1) f3/fw | 12.80 | 12.80 | 12.71 |
| (2) f3/f2 | 4.80 | 4.78 | 4.73 |
| (3) fw/Bf | 0.490 | 0.488 | 0.488 |
| (4) \|f4/fw\| | 3671 | 148.3 | 5188 |
| (5) \|f1/fw\| | 2.07 | 2.08 | 2.08 |
| (6) fASP/f1 | 1.92 | 1.91 | 2.04 |

According to the exemplary embodiments described above, it is possible to provide a zoom lens capable of effectively correcting various aberrations during zooming, offering a high level of optical performance throughout the zoom range, and suitable for a projector (image projection apparatus). Additionally, it is possible to provide an image projection apparatus including the zoom lens and capable of projecting, onto a projection surface (e.g., screen), a high-definition image (modulated image light) formed on an image display device (e.g., liquid crystal panel).

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-023848 filed Feb. 4, 2008, which is hereby incorporated by reference herein in its entirety.

What is claimed is:

1. A zoom lens comprising, in order from an enlargement conjugate side to a reduction conjugate side:
    a first lens unit of negative refractive power;
    a second lens unit of positive refractive power;
    a third lens unit of positive refractive power, the third lens unit having at least three lens elements;
    a middle lens unit including at least one lens unit; and
    a last lens unit of positive refractive power,
    wherein all the lens units, except the first lens unit and the last lens unit, move during zooming, and
    wherein the following conditions are satisfied:

$f3/fw > 4.0$ $f3/f2 > 2.0$ $fw/Bf < 0.8$ where f2 is a focal length of the second lens unit, f3 is a focal length of the third lens unit, fw is a focal length of the entire zoom lens at a wide-angle end, and Bf is an air-conversion length of back-focus.

2. The zoom lens according to claim 1, wherein the middle lens unit includes a fourth lens unit of positive or negative refractive power, and
    wherein the following condition is satisfied:

$|f4/fw| > 15$ where f4 is a focal length of the fourth lens unit.

3. The zoom lens according to claim 1, wherein the middle lens unit includes, in order from the enlargement conjugate side to the reduction conjugate side, a fourth lens unit of negative refractive power and a fifth lens unit of positive refractive power, and wherein the following condition is satisfied:

$|f4/fw|>15$ where f4 is a focal length of the fourth lens unit.

4. The zoom lens according to claim 1, wherein the following condition is satisfied:

$|f1/fw|>1.0$ where f1 is a focal length of the first lens unit.

5. The zoom lens according to claim 1, wherein the first lens unit has an aspherical lens element with an aspherical lens surface, and wherein the following condition is satisfied:

$fASP/f1<3.0$ where f1 is a focal length of the first lens unit and fASP is a focal length of the aspherical lens element.

6. The zoom lens according to claim 1, wherein the third lens unit includes a cemented lens component formed by cementing together a positive lens element and a negative lens element, and a meniscus positive lens element convex toward the reduction conjugate side.

7. The zoom lens according to claim 1, wherein in the first lens unit, a lens element closest to the reduction conjugate side is a focus lens that moves in an optical axis direction for focusing.

8. The zoom lens according to claim 1, wherein the first lens unit consists of, in order from the enlargement conjugate side to the reduction conjugate side, two meniscus negative lens elements, a cemented lens component formed by cementing together a negative lens element and a positive lens element, and a meniscus positive lens element;

the second lens unit consists of a biconvex positive lens element; and the last lens unit consists of a biconvex positive lens element.

9. The zoom lens according to claim 1, wherein a display image located on the reduction conjugate side is projected onto a predetermined surface.

10. An image projection apparatus comprising:
a display device configured to form an original image; and
a zoom lens configured to project the original image onto a projection surface and including, in order from the projection surface side toward the display device,
a first lens unit of negative refractive power;
a second lens unit of positive refractive power;
a third lens unit of positive refractive power, the third lens unit having at least three lens elements;
a middle lens unit including at least one lens unit; and
a last lens unit of positive refractive power,
wherein all the lens units, except the first lens unit and the last lens unit, move during zooming, and
wherein the following conditions are satisfied:

$f3/fw>4.0$ $f3/f2>2.0$ $fw/Bf<0.8$ where f2 is a focal length of the second lens unit, f3 is a focal length of the third lens unit, fw is a focal length of the entire zoom lens at a wide-angle end, and Bf is an air-conversion length of back-focus.

* * * * *